United States Patent [19]

McIntyre

[11] Patent Number: 5,628,383
[45] Date of Patent: May 13, 1997

[54] CLIMBING TREE STAND

[75] Inventor: Ray G. McIntyre, Grand Island, Fla.

[73] Assignee: Warren & Sweat Manufacturing Company, Grand Island, Fla.

[21] Appl. No.: 119,959

[22] Filed: Sep. 10, 1993

[51] Int. Cl.$^6$ .................................................. A47C 9/10
[52] U.S. Cl. ................................. 182/187; 182/135
[58] Field of Search ............................ 182/187, 188, 182/133–136

[56] References Cited

U.S. PATENT DOCUMENTS

| | | | |
|---|---|---|---|
| 3,116,808 | 1/1964 | Riley | 182/129 |
| 4,134,474 | 1/1979 | Stavenau | 182/187 |
| 4,410,066 | 10/1983 | Swett | 182/187 X |
| 4,723,630 | 2/1988 | Wolford | 182/187 |
| 4,890,694 | 1/1990 | Williams | 182/135 X |
| 4,953,662 | 9/1990 | Porter | 182/135 |
| 5,143,176 | 9/1992 | Burdette | 182/133 X |
| 5,205,375 | 4/1993 | Shriver | 182/187 |

FOREIGN PATENT DOCUMENTS 102303  4/1899  Germany ....................... 182/187

*Primary Examiner*—Alvin C. Chin-Shue
*Attorney, Agent, or Firm*—Maguire, Voorhis & Wells, P.A.; Robert L. Wolter

[57] ABSTRACT

A tree stand is disclosed as having an seating unit and unit to assist in climbing. The tree stand includes a main frame that extends outwardly from a tree and has a seat frame thereon that engages the front of a tree. An engagement bar attaches to the mainframe, surrounds the tree and engages the rear of the tree. A horizontal frame having a platform section thereon is mounted to the main frame below the seat. This platform frame is mounted to the main frame such that it does not engage the tree during ascension of the tree. There is also a means for securing the platform frame against the tree which may include a cinch and rachet set. When a user reaches the desired height, the rachet and cinch is used to secure the platform to the tree so the tree stand has three engagement points stabilizing it against the tree. A rest frame may also be secured to the tree stand above the seat.

4 Claims, 3 Drawing Sheets

CLIMBING TREE STAND

BACKGROUND OF THE INVENTION

The present invention relates generally to tree stands and more specifically to those tree stands that are capable of climbing a tree or other like vertical member. More specifically, the invention relates to a tree stand that engages a tree at three different engagement points, one of which is to tension the stand against the tree and stabilize the stand.

Typically, climbing tree stands include a first unit that has a seat mounted thereon and may include a foot rest platform. This first unit has a means for engaging a front of a tree and a means for engaging the opposite side of the tree, usually above the first engagement means. A second unit is a climbing aid that is typically secured to a user's feet to facilitate the climbing of the tree or like vertical member.

These tree stands are secured to the tree by the opposing forces of the engagement members along with additional means for strapping the first unit to the tree.

SUMMARY OF THE INVENTION

With the foregoing in mind, it is the object of this invention to provide a climbing tree stand that is secured and stabilized to a tree more effectively than the prior inventions in this field. It is another object to provide a light weight stand that i s capable of being carried easily, and simple to use in operation. Still another object of this invention is to provide such a stand with a frame member serving as an arm or gun rest for the user. Yet another objective is to provide a tree stand that may be used with a hand or foot climbing unit.

These and other objectives are accomplished through the use of a tree stand that engages a tree at three contact points. This tree stand includes a main frame that extends outwardly from the tree at an angle below normal. This main frame has a seat unit mounted thereon that engages the front of a tree and a member that surrounds the tree to engage the rear of the tree above the engagement point of the seat. A platform is mounted to the main frame below the seat unit and extends outward from the tree in a substantially horizontal plane. The platform and seat are adjustable so the tree stand may be used with a hand or foot climbing aid. When the user is climbing the tree, the platform does not initially engage the tree. The tree stand also has a means for securing the platform against the tree to tension the stand and thereby further stabilizing the tree stand against the tree. When the user reaches a desired height, the platform is pulled to engagement with the tree stabilizing it against the tree. In the preferred embodiment, a rest-frame member is mounted to the main frame above the seat.

DESCRIPTION OF A PREFERRED EMBODIMENT

Figure 1:
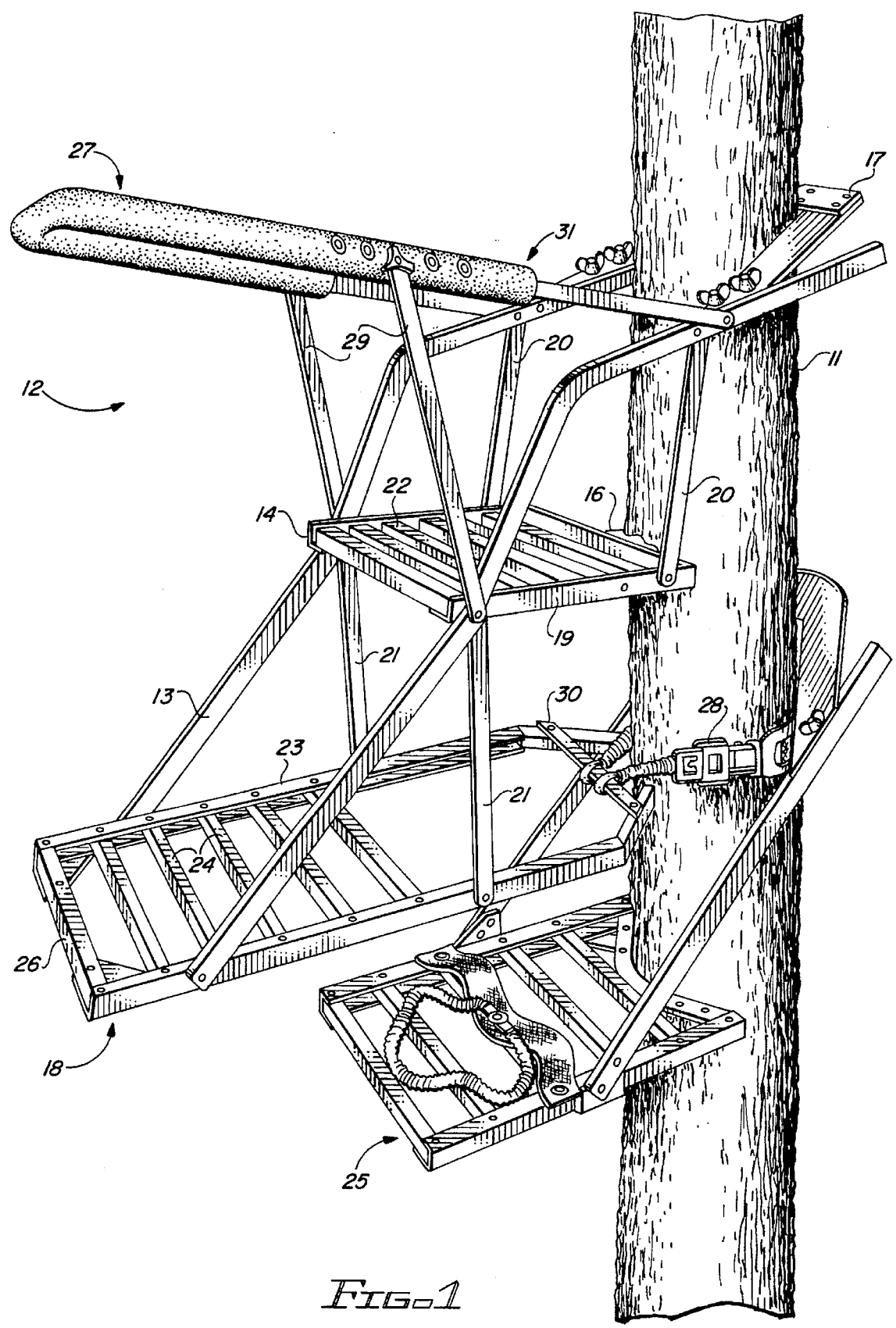
FIG. 1 is a perspective view of the tree stand in engagement with a tree.

Referring to the drawings for a better understanding of the invention, it will be appreciated that the tree stand 12 depicted therein includes a seating unit 14 and a platform frame 18 that extend outwardly from a tree 11. A lower unit 25 or an upper unit 32 is used with the stand to facilitate ascent of the tree. The entire apparatus is preferably constructed of aluminum members to provide a durable yet light weight device. The tree stand 12 includes two parallel frame members 13 that are tubular and an elongated S-shape that form the mainframe of the tree stand along with the vertical members 20 and 21. The seat unit 14 is mounted intermediate the parallel frame members 13 and has an engagement plate 16 which is mounted to the back of the seat unit 14 for engagement to the front of the tree 11.

Figure 2:
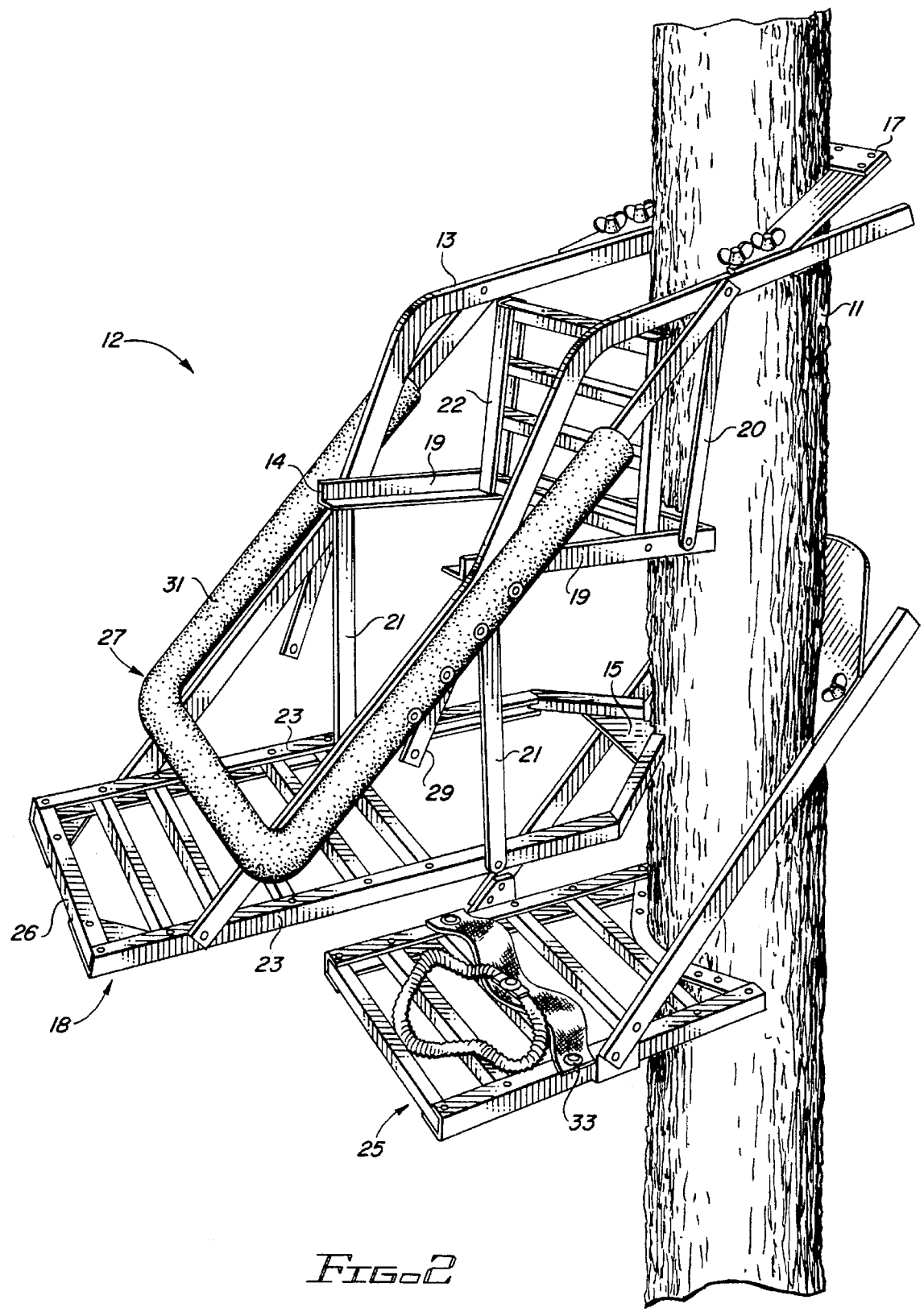
FIG. 2 is a perspective view with the seat and rest frame adjusted.

An engagement blade 17 is mounted towards the top of the parallel frame members 13 to surround and engage the sides and rear of the tree 11. The parallel frame members 13 have apertures on the upper portion thereof so the engagement blade 17 may be slidably adjusted along the longitudinal axis of the upper portion of the parallel frame members 13 for adjustment to varying diameters of trees or vertical members of the like. The engagement blade 17 may be secured to the parallel frame members 13 utilizing bolts and wing-nuts so the blade may be disengaged for slidable adjustment. The seat unit 14 comprises a U-shaped frame 19 having its open end mounted to the lower bend of the parallel frame members 13 as illustrated in FIGS. 1 and 2, with its closed end toward the tree. A vertical member 20 is mounted to each upper portion of the parallel frame member 13 outwardly from the tree 11 and depends downward. The bottom end of each vertical member 20 is mounted to the U-shaped frame member 19. A seat frame 22, as depicted in FIGS. 1 and 2, is pivotally mounted within the U-shaped frame member 19 so the seat frame 22 is adjustable to a vertical position for climbing purposes as will later be described.

Figure 3:
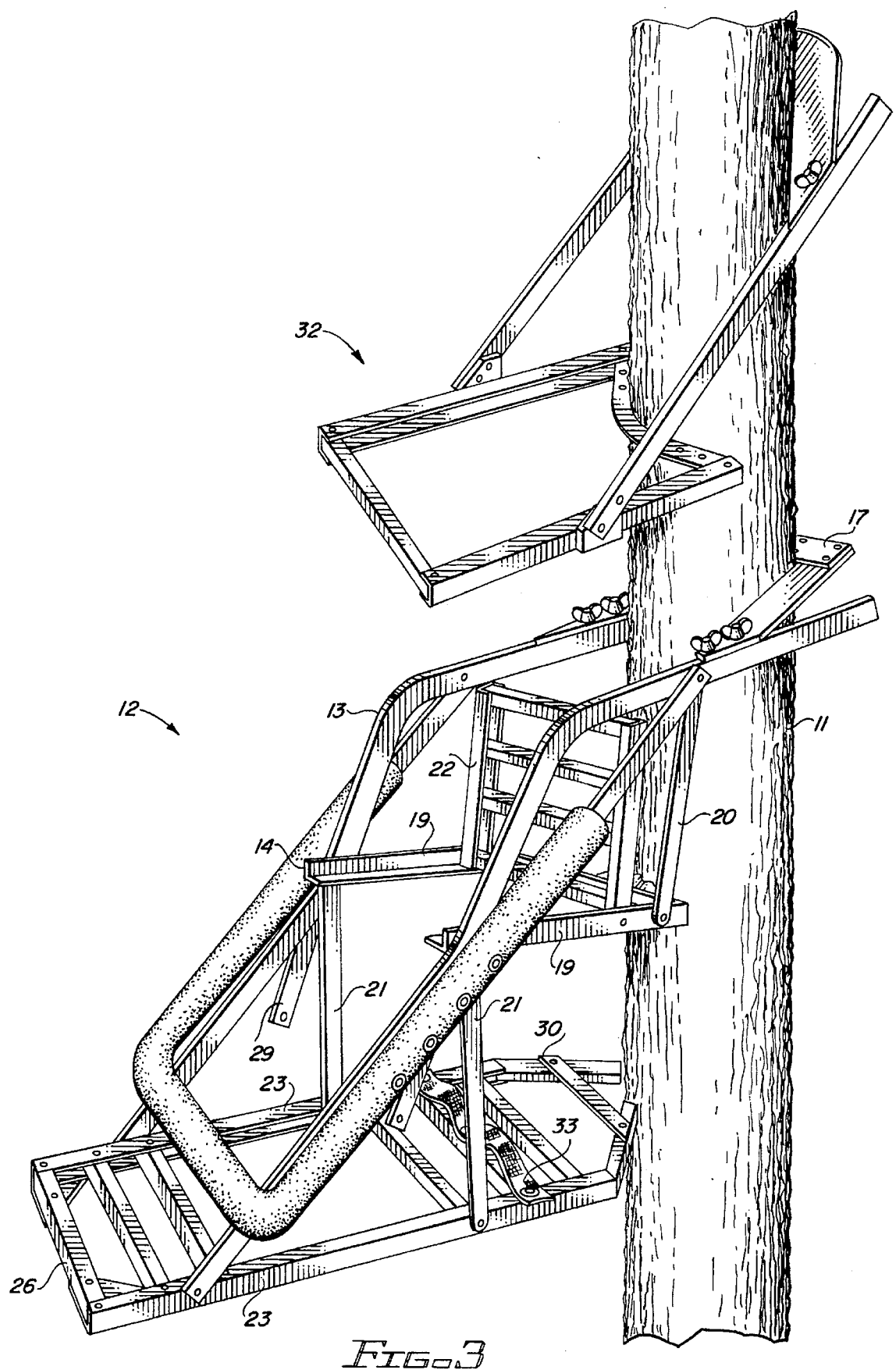
FIG. 3 is a perspective view of the tree stand with the platform adjusted.

The third engagement may be attached to the tree stand 12 in the form of a platform 18 as illustrated in FIGS. 1–3. This platform 18 includes a platform section 26 on that portion of the platform 18 distal the tree mounted intermediate channel members 23 extending outward from the tree in a substantially horizontal plane. Each channel member 23 is secured to the bottom of a parallel members 13 distal the tree and the vertical members 21 depending from the parallel members 13. The platform 18 is mounted to the tree stand 12 such that the channel members 23 or engagement plate 15 are about six inches from the base of a tree and is as close as one to two inches from the tree when a climber reaches a desired height.

The platform section 26 is adjustable along the longitudinal axis of the platform 18. As shown in FIGS. 1 through 3 the platform section 26 may include a plurality of slats 24 mounted in the channel members 23. The slats 24 are adjustable within in the channel members 23 as shown in FIG. 3. The channel members 23 are secured to seat unit 14 by members 21. The platform frame is mounted and has to channel parallel members extending outward from the tree. The channel members 23 are attached to the parallel members 13 at the end distal the tree and by the vertical frame members 21.

In FIG. 3, the tree stand 12 is equipped with an upper climbing unit 32. When the upper climbing unit 32 is used the platform section 26 is adjustable to a position below the seat unit 14. Straps 33 are attached to the platform 26 to secure a user's feet. A user pivots the seat 14 as illustrated in FIG. 3. With the platform section 26 adjusted below the seat 14, the user secures himself to the platform section 26 with straps 33 and ascends the tree in the conventional manner.

A bar 30 is attached to the platform 18 adjacent to the tree 11 for engagement with a cinch and ratchet 28 used to secure the platform 18 to the tree 11, as shown in FIG. 1. Alternatively, as illustrated in FIG. 2, an engagement plate 15 may be used to secure the cinch and ratchet 28 and engage the tree to provide support.

A rest frame 27 may be pivotally secured to the upper portion of the parallel frame members 13 and may adjusted to form a gun rest for a user. The rest frame 27 is a U-shaped frame having its open end mounted to the upper portion of the parallel frame members 13 adjacent the vertical members 20. Arm 29 is pivotally mounted to each parallel frame members as shown in FIG. 1, extends upward and attaches to the rest frame 27. The rest frame 27 has apertures along its parallel members 31 so the arms 29 may be secured along the longitudinal axis thereof enabling the rest to be selectively adjusted to a desirable height. The rest frame 27 and arms 29 may be collapsed, as shown in FIG. 2, for transportation of the tree stand. Additionally, a cushion 31 may be wrapped and secured to the rest frame 27 to avoid noise when resting a gun or other items thereon.

In operation, a user stands the tree stand 12 adjacent the tree 11 so the engagement plate 16 on the seat unit 14 engages the front of the tree 11. The engagement blade 17 is adjusted to the diameter of the tree 11 to surround and engage the rear of the tree 11. The lower unit 25 engages the tree 11 below the tree stand. If an upper climbing unit 33 is used, it engages the tree above the tree stand 12 as depicted in FIG. 3. When using the lower climbing unit 25, the seat frame 22 is pivoted to a vertical position and the platform section 26 is adjusted away from the tree 11, so the user may step into the vertical space provided therein. The user then straps his/her feet to the lower unit 25 and begins to climb the tree 11 in the conventional method. In the case of using an upper climbing unit 33, in FIG. 3, the platform section 26 is adjusted below the seat 14. The user straps his/her feet to the platform section 26 and uses the upper climbing unit 33 to climb the tree.

The platform 18 does not engage the tree 11 during the ascent. When the user reaches the desired height, and the tree stand is initially secured, the ratchet and cinch set 28 is used to force the platform frame 18 in engagement with the tree 11; thereby, securing the entire stand against the tree and providing three engagement points on the tree stand 12 to further stabilize the tree stand against the tree 11.

While we have shown our invention in one form, it will be obvious to those skilled in the art that it is not so limited but is susceptible of various changes and modifications without departing from the spirit thereof.

What I claim is:

1. A tree stand for climbing a tree and the like, having a seating unit and climbing aid wherein said seating unit comprises:

(a) a main frame, extending outward from the tree;
   (b) a seat pivotally mounted to said main frame;
   (c) a first engagement means, mounted to said seat, for engagement with the tree;
   (d) a second engagement means, mounted to said main frame above said seat, to surround and engage the rear of the tree above the first engagement means, whereby said first and second engagement means, contact with the tree facilitates the climbing of said tree;
   (e) a platform mounted to said main frame distal said second engagement means in spaced relation to said tree, said platform having a pair of parallel members mounted to the bottom of the main frame and a platform section mounted intermediate said parallel members adjustable along the longitudinal axis of said parallel member; and
   (f) means, mounted to said platform, to secure the platform against the tree.

2. A tree stand for climbing a tree and the like, having a seating unit and climbing aid wherein said seating unit, comprising:

(a) a main frame, extending outward from the tree, wherein said main frame includes two elongated parallel frame members extending outward from said tree, a first arm mounted to each parallel frame members adjacent the tree, each first arm depending from said elongated members, a second arm mounted to each said parallel frame member outward from said first arm, each second arm depending from said elongated parallel frame members;
   (b) a seat mounted to said main frame, wherein said seat includes a U-shaped frame mounted to said first arm elongated parallel member, and a seat frame pivotally mounted in said U-shaped frame;
   (c) a first engagement means mounted to said seat, for element with the tree;
   (d) a second tree engagement means, mounted to said main frame above said seat, to surround and engage the rear of the tree above the first engagement means whereby said first and second engagement means contact with the tree facilitates the climbing of said tree;
   (e) a platform mounted to said main frame distal said second engagement means in spaced relation to said to said tree; and
   (f) means, mounted to said platform, to secure the platform against the tree.

3. A tree stand as defined in claim 2 wherein said platform comprises:

(a) a pair of parallel members mounted to the bottom of the second arms on main frame; and
   (b) a platform section slidably mounted intermediate the pair of parallel members.

4. A tree stand as defined in claim 3 including a rest-frame pivotally mounted to the main frame extending outwardly from the tree above the seat to form a reset.

* * * * *